Aug. 10, 1943.   H. F. BAUER ET AL   2,326,118
PREGUMMED HANGING MATERIAL
Filed Oct. 4, 1940
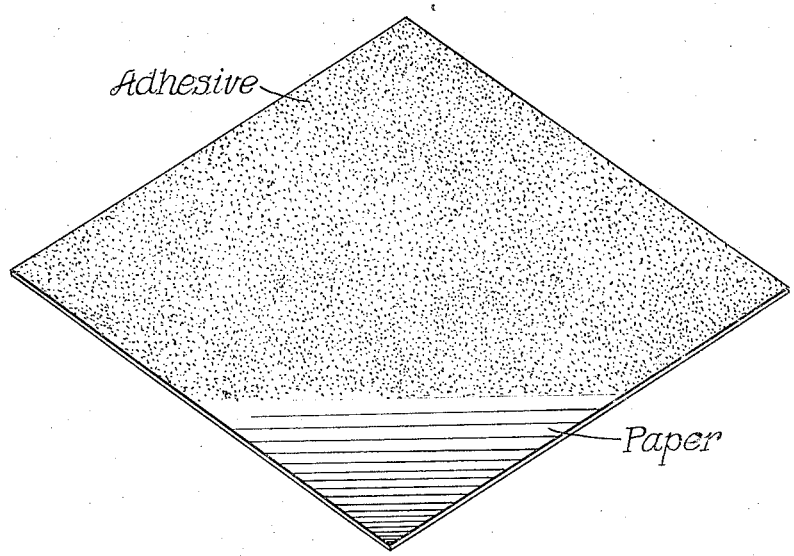
Inventors:
Hans F. Bauer,
Jordan V. Bauer,
Don M. Hawley Patented Aug. 10, 1943

2,326,118

UNITED STATES PATENT OFFICE 2,326,118

PREGUMMED HANGING MATERIAL

Hans F. Bauer, Chicago, Jordan V. Bauer, Elmwood Park, and Don M. Hawley, Geneva, Ill., assignors to Stein, Hall Manufacturing Company, Chicago, Ill., a corporation of Delaware Application October 4, 1940, Serial No. 359,696

6 Claims. (Cl. 117—122)

This invention relates to new and improved pre-gummed hanging papers containing amylaceous adhesive compositions. The invention is especially concerned with the preparation of a pre-gummed hanging paper containing amylaceous remoistening adhesives having slip characteristics together with high bonding strength.

The term "amylaceous adhesives" is employed to refer to those types of adhesives which are prepared from starches and starch degradation products such as dextrines and starch gums. The term "remoistening adhesive" refers to that type of adhesive which is applied to a sheet of paper, or other surface, in the presence of moisture and dried to form a coating, which, on being remoistened, will quickly develop adhesive properties for bonding the paper, or other surface, to other materials. The article containing the potentially adhesive film is referred to as a "pre-gummed article." Thus, wall-paper, or poster paper containing a dried, potentially adhesive film, is referred to herein as a "pre-gummed hanging paper."

The problem of preparing a pre-gummed hanging paper is a difficult one and for this reason wall-paper and other hanging papers are not generally available in pre-gummed form. Such papers as usually sold in the trade contain no adhesive coating and the adhesive coating is applied by the paper hanger at the time that the paper is hung. The average person is not sufficiently skilled to be able to hang paper where the paper hanging process also requires the application of the adhesive or paste.

One of the principal difficulties attending the preparation of a pre-gummed wall-paper, or other pre-gummed hanging paper, containing a remoistening adhesive is that the dried adhesive coating, on being remoistened, must have slip characteristics and at the same time must have enough immediate adhesive bonding strength to hold the paper to the wall, or other surface to which it is being applied. Many remoistening adhesives either do not have slip characteristics or suitable bonding strength. The adhesive must also be of such a nature that the bulges or blisters formed beneath the paper when it is hung will shrink without distortion when the paper dries.

One of the objects of the present invention is to produce a new and improved type of pre-gummed wall-paper or other pre-gummed hanging papers where the remoistening adhesive is required to have slip characteristics and at the same time to have sufficient cohesiveness while still wet to hold surfaces together which would normally tend to spring apart. Other objects will appear hereinafter.

These objects are accomplished in accordance with this invention by preparing a pre-gummed hanging paper containing a remoistening adhesive containing an adhesive base formed by treating a dextrine, or a starch conversion product, with an aldehyde compound such as, for example, formaldehyde, paraformaldehyde or acetaldehyde and then roasting the resultant reaction mixture at a relatively high temperature, preferably above 300° F. Formaldehyde or paraformaldehyde are preferred for our purpose because of their low cost and effectiveness.

The accompanying drawing pictures the pre-gummed hanging material.

The adhesive base may be made by starting with a dextrine or a starch gum such as a British gum, or by starting with a starch and converting it with or without an acid, then adding the aldehyde compound and finally roasting. The period of roasting is such as to produce a product which will swell in cold water, and the time required will normally be about 2 to 4 hours at temperatures within the range of 300° F. to 340° F. If higher temperatures are used, relatively less time is required. The characteristics of the product may be varied by varying the time of roasting and the type of starting material so that the final product will swell in cold water and form a soft paste in proportions by weight from about 0.5 part of the product per part of water to 16 parts of the product per part of water. The roasting is carried out under substantially dry conditions.

The adhesive products produced by this method of treatment differ markedly from ordinary starch or dextrine adhesives in that the individual granules of the product swell in cold water but do not dissolve or disperse to the extent that they lose their individual identity.

Apparently when dextrines or amylaceous gums are treated with formaldehyde in the manner disclosed, condensation takes place and the individual granules of dextrine lose their normal properties of dissolving or dispersing in hot or cold water and assume the property of swelling in water without substantial solubility.

It is desirable for the purpose of the invention to add the formaldehyde compound after the starch has been substantially degraded. If the acid, formaldehyde and non-degraded starch are all mixed together and the conversion is carried out at relatively high temperatures, say, 300° F., the product will become mushy in water but has no substantial adhesive properties. If the conversion is carried out long enough, the product will become dark in color and develop substantial adhesive properties, but it is unsuitable for the stronger types of adhesive applications and in many cases cannot be used because of its dark color. Furthermore, the properties are still markedly different from the properties of the products prepared in accordance with this invention. Accordingly, it appears to be important that the formaldehyde compound be added to a degraded starch or dextrine and that the conversion be carried out under substantially dry conditions at temperatures which are relatively high.

One of the principal advantages of the adhesive base prepared in accordance with this invention is that it may be applied to a moist surface in powdered form and the moisture in the surface to which it is applied will cause the product to adhere to the surface. Thereafter, the surface to which the powder has been applied, as, for example, a moving web of paper may be passed over hot rolls, or other similar drying apparatus, without sticking to such apparatus. The ordinary type of degenerated starch or dextrine, as, for instance, a high soluble dextrine, tends to stick to such hot surfaces and furthermore, it does not have the other adhesive properties of the adhesive base herein described. One of the important properties of this adhesive base is a slip characteristic of such a nature that the surface to which it is applied upon being remoistened will slip or slide over another surface. As will readily be appreciated, such a slip characteristic is extremely important in those types of applications where it is necessary to slide an article containing the adhesive in order to match it with another article, as, for instance, in matching wall-paper patterns. The bonding properties are such that they will retain a plurality of surfaces in contact with each other while the adhesive is wet and produce an adhesive bond of high strength when the adhesive dries. When the adhesive is used to prepare pre-gummed hanging papers, bulges and blisters will shrink out of the paper as it dries.

The invention will be further illustrated but is not limited by the following examples, in which the quantities are stated in parts by weight unless otherwise indicated.

Example I

To 1000 parts of a white corn dextrine which was converted to a solubility of about 10% in water at 75° F. was added 5 parts of paraformaldehyde and the mixture roasted for 4 hours at a temperature within the range of 300° F. to 340° F. The white corn dextrine used is a type sold under the trade name of XO by Stein, Hall Manufacturing Company.

The resultant product swelled in cold water to form a soft paste at a temperature of about 70° F. to 75° F. when mixed in the proportions of 1 part of said product to 4 parts of water. The original dextrine before treatment with formaldehyde gave a fluid adhesive when cooked with two parts of water as contrasted with the more viscous and less highly dispersible final product.

Example II

The surface of a wall-paper raw stock weighing about 8 grams per square foot was moistened with a water solution of urea in proportions within the range of about 1 gram to about 10 grams per square foot of raw stock. The aqueous solution of urea was made by mixing together 90% water with 10% urea.

After the moistening liquid had been applied evenly and uniformly over the surface of the wall-paper stock the dampened sheet was dusted with a dry powdered adhesive base of the same composition as that obtained in accordance with Example I and the resultant raw stock was then dried. The amount of powdered material added was such that the total weight of dry adhesive applied was within the range of about 2 grams to about 6 grams per square foot. The ground coat and wall-paper print were subsequently applied to the pre-gummed raw stock to produce a finished pre-gummed wall-paper which required only moistening of the adhesive coated surface in order to be hung. This paper exhibited excellent slip characteristics and after the adhesive coating had been moistened it could easily be slid over the surface of the wall in order to match the pattern of the wall-paper. At the same time, the adhesive had sufficient bonding power while wet to hold the paper against the wall and dried to form an adhesive bond between the paper and the wall of excellent bonding strength. Any bulges or blisters formed in the wall-paper while wet tended to shrink and disappear when the paper was dried.

It will be understood that auxiliary materials may be mixed with the dry base adhesive for certain purposes, or such materials may be added to the moistening liquid. Thus, it is desirable in some instances to mix or disperse either with the adhesive base or the moistening liquid plasticizing agents, auxiliary adhesive materials, or such chemicals as will produce a desirable modification of the adhesive characteristics. For the purpose of making pre-gummed hanging papers certain normally solid substances have been found to be especially desirable as plasticizing agents, as, for example, urea, thiourea, sodium nitrate, sodium thiocyanate, potassium thiocyanate, potassium nitrate, calcium chloride, magnesium chloride and zinc chloride. In certain instances liquid plasticizing agents may be employed, as, for instance, glycerine, diethylene glycol, ethylene glycol, sodium lactate and other plasticizing agents.

Other substances may be used to serve as plasticizing agents or for other purposes, as, for example, sodium acetate, sodium chloride, sodium diacetate, sodium monophosphate, ammonium chloride and sugars. Certain of these salts, in addition to their plasticizing action in compositions containing urea and amylaceous substances, tend to inhibit crystallization of the urea or act as preservatives.

In some instances it may be desirable to include in the adhesive composition a mild acid, as, for instance, citric acid, tartaric acid, malic acid, oxalic acid or boric acid, these acids serving to act as stabilizing agents in adhesive compositions containing urea by neutralizing any ammonia formed.

In some instances it may be desirable to use in conjunction with the adhesive base viscosity increasing agents, as, for example, borax and sodium aluminate. Various other auxiliary materials may be incorporated with the adhesive base as, for example, wetting agents, solvents, antifoaming agents and filling materials, in order to obtain those special effects for which the use of such materials is known to the adhesive art. In some cases it may be desirable to incorporate with the adhesive base a small amount of an oil, grease or wax in proportions of, say, 0.5% to about 3.0%.

In such instances where it is desirable, our disclosed adhesive compositions may be mixed with compatible adhesive material made from animal glue, fish glue, casein, starch, dextrines, soluble lignins, natural gums, and water soluble natural or synthetic resins.

In practising the invention starches and dextrines derived from wheat, rice, barley, corn, oats, rye, potato, cassava, tapioca and sago, or from any other source, may be employed.

Where a plasticizing agent is employed the amount used may vary rather widely, depending upon the particular type of plasticizing agent and the purpose for which the adhesive composition is to be used. In general, we prefer to use normally solid plasticizing agents, for example, a water soluble urea, in an amount of 3% and upward. The amount of plasticizing agent, however, normally forms a minor proportion of the composition and for most practical purposes will not be greater than about 35% by weight of the solids content. If a liquid plasticizing agent is employed, for example, glycerine, the amount used will normally be within the range of about 1% to about 10%.

As already indicated, the aldehyde compound, for instance, formaldehyde or paraformaldehyde, is added to a partially converted starch and for the purpose of the invention should not be added before the starch is partially converted. The degree to which the starch is converted before the aldehyde is added may vary through a fairly wide range. For most purposes it is desirable to add the formaldehyde subsequent to that phase in the conversion where the starch starts to become partially soluble in water. The degree of solubility may vary rather widely, depending upon the results desired. The subsequent roasting of the partially converted partially soluble starch conversion product under substantially dry conditions will tend to reduce the solubles content of the starch conversion product. The temperature employed during this roasting, as previously indicated, should preferably be relatively high but insufficiently high to char the starch conversion product.

The cold water solubility of the amylaceous conversion product prior to the addition of the formaldehyde compound may vary rather widely and may be even as much as 100%, but usually it is preferable that the amylaceous conversion product be converted into a state where its cold water solubility (at 75° F.) is less than 50% and the converted product is still light in color. The particular starting material used in Example I has a cold water solubility of about 10%. The preferred products in accordance with the invention form short soft white pastes with cold water. If the conversion product is converted to a high solubility prior to the addition of the formaldehyde compound the resultant product will form a darker paste.

An example of a product of this type may be prepared as follows:

*Example III*

To 1000 parts tapioca British gum which was converted to a solubility of about 90% in water at 75° F. was added 10 parts paraformaldehyde and the mixture roasted for 3 hours at 340° F. The resultant product swelled in cold water to give a soft pasty gel when mixed in the proportions of 1 part of the said product to 8 parts of water. The original British gum before treatment with the formaldehyde gave a fluid highly dispersed adhesive when cooked with 2 parts of water as contrasted with the relatively much more viscous and less highly dispersible final product. Furthermore, it was necessary to cook the original British gum with water to develop its adhesive properties, whereas, the final product would swell in either cold or hot water to form an adhesive gel or paste.

The white corn dextrine and the British gum referred to in Examples I and III are typical amylaceous conversion products, the preparation of which is well known to the art of dextrine manufacture. The final products, however, which are produced by the subsequent treatment with formaldehyde and heating are to our knowledge new and unique and possess novel properties which are highly desirable for certain applications.

It should be understood that in the commercial manufacture of the adhesive base any of the well known methods for the dry dextrinization or conversion of starch may be used. The essential requirement for our purposes is that formaldehyde be introduced subsequent to that phase of the converting process wherein the starch conversion product begins to assume thin boiling starch or dextrine characteristics.

The term "amylaceous conversion product" is employed herein to describe a degraded or partially degraded starch, as, for example, a dextrine or a starch gum. Dextrines are usually obtained by roasting or heating starch in the presence of acids. Starch gums are usually obtained by roasting or heating starch with very small amounts of acid catalysts as differentiated from dextrines which are formed by heating the starch with relatively large amounts of acid catalysts.

As indicated by the examples, the adhesive may be applied in several separate phases, the one phase being a liquid phase including a plasticizing agent and possibly additional chemicals and adhesive materials, and the other phase being a solid phase in which the adhesive base is applied in powdered form to the previously applied liquid.

The method of applying the adhesive compositions to the paper may vary widely, depending upon the particular composition and the particular type of material to which it is applied. Any of the well known methods of applying adhesive compositions may be used.

Having thus described the invention, what we claim as new and desire to secure by Letters Patent of the United States is:

1. A pre-gummed hanging material comprising a coating of a remoistening adhesive formed from an amylaceous conversion product by roasting a partially converted, at least partially cold water soluble amylaceous conversion product under substantially non-gelatinizing conditions with an aldehyde compound selected from the group consisting of formaldehyde, paraformaldehyde and acetaldehyde at temperatures above about 300° F. but insufficiently high to char the resultant conversion product until the product obtained swells and forms short, soft pastes in cold water.

2. A pre-gummed hanging material comprising a coating of a remoistening adhesive formed from an amylaceous conversion product by roasting an incompletely dextrinized starch conversion product having a substantial cold water solubility less than about 50% under substantially non-gelatinizing conditions with an aldehyde compound selected from the group consisting of formaldehyde, paraformaldehyde and acetaldehyde at temperatures above about 300° F. but insufficiently high to char the resultant conversion product until the product obtained swells and forms short, soft pastes in cold water.

3. A pre-gummed hanging material comprising a coating of a remoistening adhesive formed from an amylaceous conversion product by roasting an incompletely dextrinized starch conversion product having a substantial cold water solubility less than about 50% under substantially non-gelatinizing conditions with an aldehyde compound selected from the group consisting of formaldehyde, paraformaldehyde and acetaldehyde at temperatures within the range of about 300° F. to 340° F. until the product obtained swells and forms short, soft pastes in cold water.

4. A pre-gummed hanging material comprising a coating of a remoistening adhesive formed from an amylaceous conversion product by roasting an incompletely dextrinized starch conversion product having a substantial cold water solubility less than about 50% under substantially non-gelatinizing conditions with a small amount of paraformaldehyde at temperatures within the range of about 300° F. to 340° F. until the product obtained swells and forms short, soft pastes in cold water.

5. A pre-gummed hanging material comprising a coating of a remoistening adhesive formed by roasting an incompletely dextrinized grain starch having substantial cold water solubility less than about 50% under substantially non-gelatinizing conditions with an aldehyde compound selected from the group consisting of formaldehyde, paraformaldehyde and acetaldehyde at temperatures above about 300° F. but insufficiently high to char the resultant conversion product until the product obtained swells to form short, soft pastes in cold water.

6. A pre-gummed hanging material comprising a coating of a remoistening adhesive formed by roasting an incompletely dextrinized, partially cold water soluble corn starch conversion product under substantially non-gelatinizing conditions with paraformaldehyde at temperatures within the range of about 300° F. to 340° F. until the product obtained swells and forms short, soft pastes in cold water.

HANS F. BAUER.
JORDAN V. BAUER.
DON M. HAWLEY.